(12) United States Patent
Judd et al.

(10) Patent No.: US 6,766,679 B1
(45) Date of Patent: Jul. 27, 2004

(54) SYSTEM AND METHOD FOR SPINDLE DRIVE DOWNFORCE CALIBRATION

(75) Inventors: Clayton E. Judd, Buda, TX (US); Justo Bryand, Jr., Pflugerville, TX (US)

(73) Assignee: Lam Research Corporation, Fremont, CA (US)

( * ) Notice: Subject to any disclaimer, the term of this patent is extended or adjusted under 35 U.S.C. 154(b) by 143 days.

(21) Appl. No.: 10/113,755

(22) Filed: Mar. 27, 2002

(51) Int. Cl.$^7$ ............................................... G01L 25/00
(52) U.S. Cl. ......................................................... 73/1.15
(58) Field of Search ................................ 73/1.08, 1.15, 73/865.9; 438/14

(56) References Cited

U.S. PATENT DOCUMENTS 3,759,082 A * 9/1973 Provenzano et al. ......... 73/1.15
4,798,094 A * 1/1989 Newhall et al. ......... 73/862.584
6,083,082 A * 7/2000 Saldana ............................ 451/5

* cited by examiner

*Primary Examiner*—Robert Raevis
(74) *Attorney, Agent, or Firm*—Martine & Penilla, LLP

(57) ABSTRACT

An invention is provided for spindle downforce calibration. The system includes a calibration wafer carrier having a calibration load cell recess, and a calibration load cell disposed within the calibration load cell recess. The system further includes a meter in communication with the calibration load cell. In operation, the calibration load cell measures a downward force applied to the to the calibration wafer carrier. The measurement can be taken when the calibration wafer carrier is positioned substantially at a polishing height, which is substantially equivalent to a height of a normal wafer carrier during a chemical mechanical polishing (CMP) operation. In one aspect, the measured downward force is compared to a tool downward force measurement that is measured using a tool load cell, which is generally utilized to measure tool downward force during a normal CMP process.

18 Claims, 8 Drawing Sheets

SYSTEM AND METHOD FOR SPINDLE DRIVE DOWNFORCE CALIBRATION

BACKGROUND OF THE INVENTION

1. Field of the Invention

This invention relates generally to semiconductor manufacturing equipment, and more specifically to spindle downforce calibration using an internal load cell inside a carrier.

2. Description of the Related Art

Often, in the fabrication of semiconductor devices, there is a need to perform chemical mechanical planarization (CMP) operations. By way of background, integrated circuit devices are in the form of multi-level structures, wherein transistor devices having diffusion regions are formed at the substrate level. In subsequent levels, interconnect metallization lines are patterned and electrically connected to the transistor devices to define desired functional devices. In addition, patterned conductive layers are insulated from other conductive layers by dielectric materials, such as silicon dioxide.

As more metallization levels and associated dielectric layers are formed, the need to planarize the dielectric material grows. Without planarization, fabrication of further metallization layers becomes substantially more difficult due to the variations in the surface topography. In other applications, metallization line patterns are formed in the dielectric material and metal CMP operations are performed to remove excess material.

Typically, a chemical mechanical planarization (CMP) system is utilized to polish a wafer as described above. A CMP system generally includes system components for handling and polishing the surface of a wafer, such as an orbital polishing pad, or a linear belt polishing pad. The pad itself often is made of a polyurethane material or polyurethane in conjunction with other materials such as, for example a stainless steel belt. In operation, the belt pad is put in motion and a slurry material is applied and spread over the surface of the belt pad. Once the belt pad having slurry on it is moving at a desired rate, the wafer is lowered onto the surface of the belt pad. In this manner, wafer surface that is desired to be planarized is substantially smoothed, much like sandpaper may be used to sand wood. The wafer may then be cleaned in a wafer cleaning system.

FIG. 1A shows a linear polishing apparatus 10, which is typically utilized in a CMP system to polish away materials on a surface of a semiconductor wafer 16. The material being removed may be a substrate material of the wafer 16 or one or more layers formed on the wafer 16. Such a layer generally includes one or more of any type of material formed or present during a CMP process such as, for example, dielectric materials, silicon nitride, metals (e.g., aluminum and copper), metal alloys, and semiconductor materials.

In operation, the linear polishing apparatus 10 utilizes a polishing belt 12, which moves linearly in respect to the surface of the wafer 16. The belt 12 is a continuous belt rotating about rollers 20, which are typically driven by a motor so that the rotational motion of the rollers 20 causes the polishing belt 12 to be driven in a linear motion 22 with respect to the wafer 16.

The wafer 16 is held by a wafer carrier 18, generally using a mechanical retaining ring and/or by vacuum. The wafer carrier 18 positions the wafer atop the polishing belt 12 and moves the wafer 16 down to the polishing belt 12, applying the wafer 16 to the polishing belt 12 with pressure such that the surface of the wafer 16 is polished by a surface of the polishing belt 12. Typically, the wafer carrier 18 is part of a spindle drive assembly 30 (shown in FIG. 1B) that enables application of polishing pressure to the wafer 16.

FIG. 1B shows a conventional spindle drive assembly 30 that may be utilized to apply the wafer 16 to the polishing belt in the CMP apparatus 10 (as shown above in FIG. 1A). The spindle drive assembly 30 includes the wafer carrier 18 connected to a spindle 42. The spindle 42 is attached to a force magnifier 34, which is connected to a hinge 40 and an air cylinder 32. Typically, the force magnifier 34 is a machined aluminum arm that acts in a manner similar to a lever such that force applied by the air cylinder 32 is magnified onto the spindle 42. The spindle 42 then pushes down the wafer carrier 18, known as applying downforce, which in turn applies pressure to the wafer 16 for polishing action (as shown in FIG. 1A).

During a planarization process, the wafer removal rate profile is highly dependent on the wafer carrier 18 downforce pressure exerted by the spindle 42. Thus, if the wafer carrier 18 downforce pressure is too high for a particular process, the overall effect of the polishing is diminished. Hence, the downforce pressure exerted by the spindle 42 is generally calibrated prior to use of the CMP system.

FIG. 1C is diagram showing a prior art spindle force downforce calibration system 50. As shown in FIG. 1C, the spindle force downforce calibration system 50 attaches to the wafer carrier 18, and includes an alignment plate 54 positioned below a polishing plate 52, and a load cell holder 56 that holds a button load cell 58 above the polishing belt 12. In normal operation, the polishing plate 52 is used to hold a wafer during the polishing process. However, during calibration, the alignment plate 54 is positioned below the polishing plate 52 to align placement of the load cell holder 56. In particular, the alignment plate 54 includes a beveled center 60, in which the top portion load cell holder 56 is inserted. In this manner, the load cell holder 56 can be positioned in the center of the carrier 18 to equalize the downforce measured.

The load cell holder 56 holds the button load cell 58, which is used to measure downforce for calibration. As mentioned above, the load cell holder 56 is located above the polishing belt 12 and below the alignment plate 54. Thus, in operation, the spindle drive assembly 42 applies downward force to the wafer carrier 18, which in turn transfers the downforce to the button load cell 58 via the alignment plate 54 and the load cell holder 56. In this manner, the button load cell 58 measures the downforce at the center of the polishing plate 52. Typically, the button load cell 58 is attached to a hand-held meter, which can be read to determine the measured downward force.

Unfortunately, the prior art spindle force downforce calibration system 50 requires the wafer carrier 18 to be positioned approximately three inches above the polishing belt 12. Since the wafer carrier 18 is not located at the position of the polishing belt during calibration, the measured downforce will be different than what is actually applied during normal CMP operation. More specifically, linkage is used to apply downforce to the spindle drive assembly 42. However, the force applied by the linkage, or force amplifier, varies depending on the position of the linkage when the downforce is applied. The linkage has a different position when the wafer carrier 18 is located three inches above the polishing belt 12 than when the wafer carrier 18 is positioned approximately at the same level as the polishing belt 12. As a result, 20–30 psi calibration errors can occur during calibration using the prior art spindle force downforce calibration system 50.

In view of the foregoing, there is a need for a CMP calibration system capable of providing accurate calibration results. Hence, the CMP calibration system should measure downforce during calibration at approximately the wafer carrier height used during normal CMP operation.

SUMMARY OF THE INVENTION

Broadly speaking, the present invention fills these needs by providing a spindle drive downforce calibration apparatus that includes a load cell located within the calibration wafer carrier. In one embodiment, a method is disclosed for spindle downforce calibration. A calibration wafer carrier is provided having a calibration load cell recess. A calibration load cell is positioned within the calibration load cell recess. Downward force is applied to the calibration wafer carrier, while the calibration wafer carrier is positioned substantially at a polishing height. In this case, the polishing height is substantially equivalent to a height of a normal wafer carrier during a chemical mechanical polishing (CMP) operation. The downward force is then measured using the calibration load cell.

In an additional embodiment, a system for spindle downforce calibration is disclosed. The system includes a calibration wafer carrier having a calibration load cell recess, and a calibration load cell disposed within the calibration load cell recess. The system further includes a meter in communication with the calibration load cell. In operation, the calibration load cell measures a downward force applied to the to the calibration wafer carrier. The measurement can be taken when the calibration wafer carrier is positioned substantially at a polishing height, which is substantially equivalent to a height of a normal wafer carrier during a chemical mechanical polishing (CMP) operation. In one aspect, the measured downward force is compared to a tool downward force measurement that is measured using a tool load cell, which is generally utilized to measure tool downward force during a normal CMP process.

A calibration wafer carrier for spindle downforce calibration is disclosed in a further embodiment of the present invention. The calibration wafer carrier includes a calibration load cell recess, and a calibration load cell disposed within the calibration load cell recess. The calibration load cell is capable of comparing resistances from stretched metal layers to measure downward force. In addition, the calibration wafer carrier includes a downforce meter connector that is coupled the calibration load cell and to a meter. En operation, the calibration load cell measures a downward force applied to the to the calibration wafer carrier when the calibration wafer carrier is positioned substantially at a polishing height, which is substantially equivalent to a height of a normal wafer carrier during a chemical mechanical polishing (CMP) operation. In one aspect, the calibration load cell can provide the calibration data to the meter, which in one embodiment can be a hand-held meter. Also, the calibration wafer carrier generally replaces a normal wafer carrier during a calibration operation.

By locating the calibration load cell within the calibration wafer carrier, the spindle drive downforce can be measured at the polishing height, which is the normal wafer carrier height during a CMP process. As a result, higher measurement accuracy is achieved. In addition, calibration time is greatly reduced using the embodiments of the present invention because the spindle drive downforce calibration system is self-contained and does not require the placement of various loose calibration components beneath the wafer carrier. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a spindle drive downforce calibration apparatus that includes a load cell located within the calibration wafer carrier. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

The spindle downforce calibration apparatus of the embodiments of the present invention comprises a calibration wafer carrier that includes a calibration load cell installed in the center, which is connected to a meter. The calibration load cell is used as a standard to calibrate the spindle drive assembly load cell. Broadly speaking, during calibration, the normal wafer carrier is replaced with the calibration wafer carrier, which is then used to measure applied downforce and calibrate the spindle drive assembly load cell. Thereafter, the calibration carrier is removed and the normal wafer carrier is replaced. In this manner, the calibration carrier allows the spindle downforce to be calibrated using the same carrier height that is used during a normal CMP process.

Figure 1A:
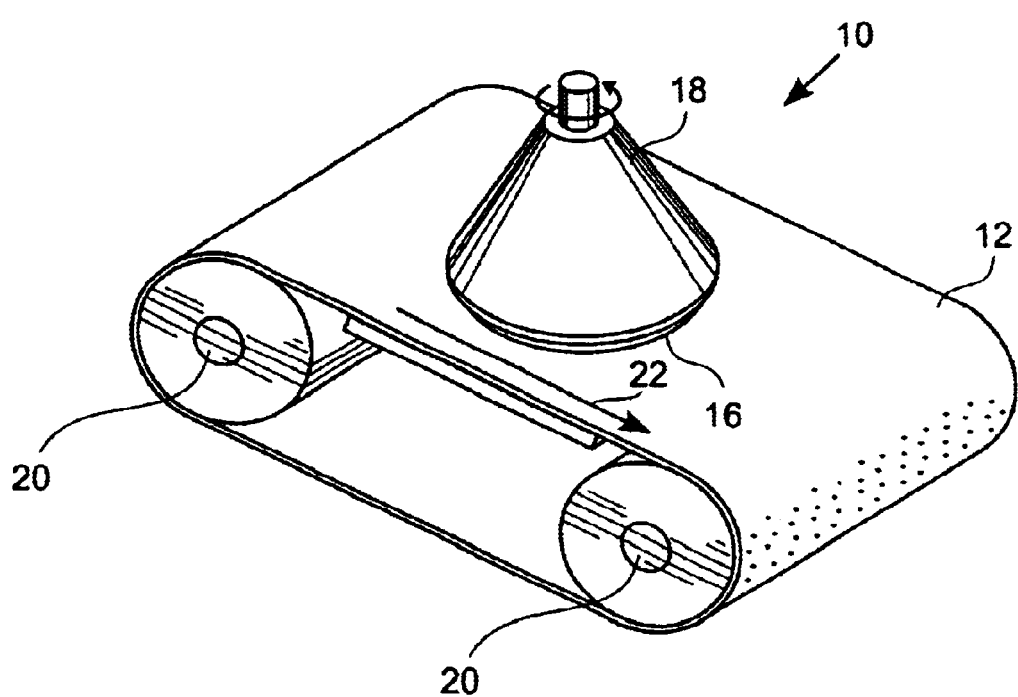
FIG. 1A shows a linear polishing apparatus, which is typically utilized in a CMP system.
Figure 1B:
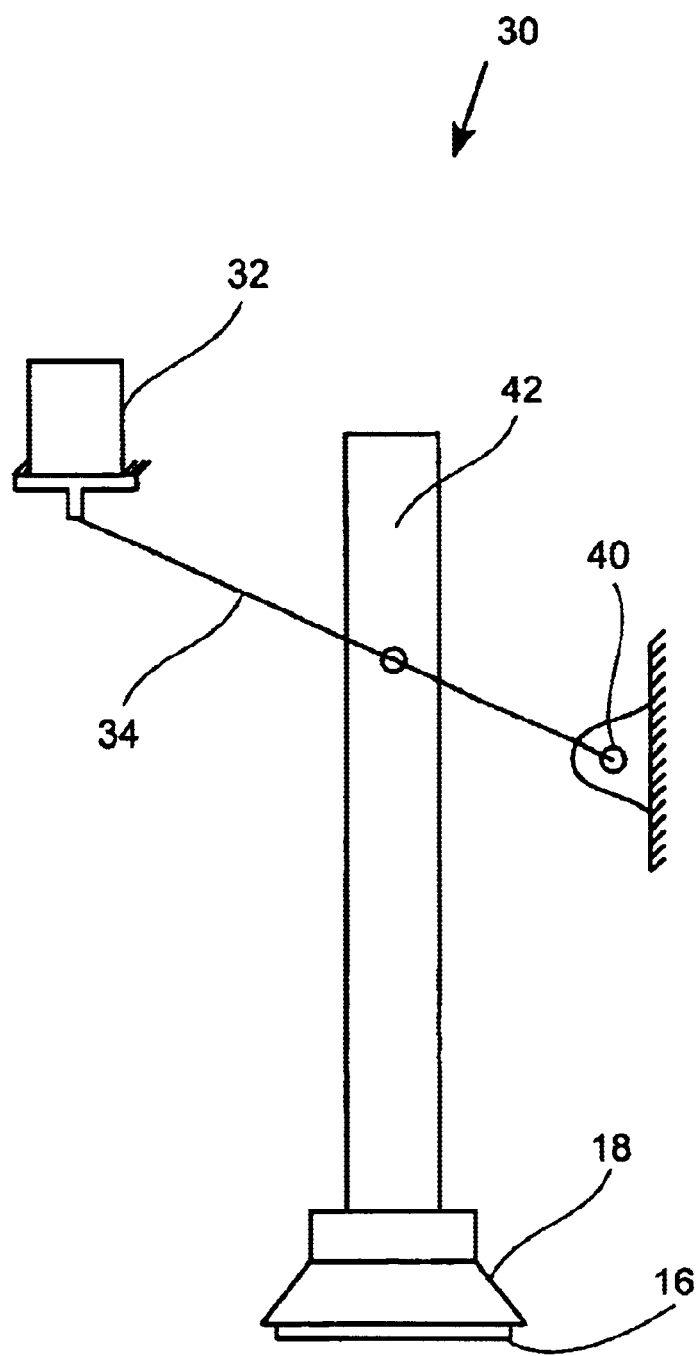
FIG. 1B shows a conventional spindle drive assembly that may be utilized to apply the wafer to the polishing belt in the CMP apparatus.
Figure 1C:
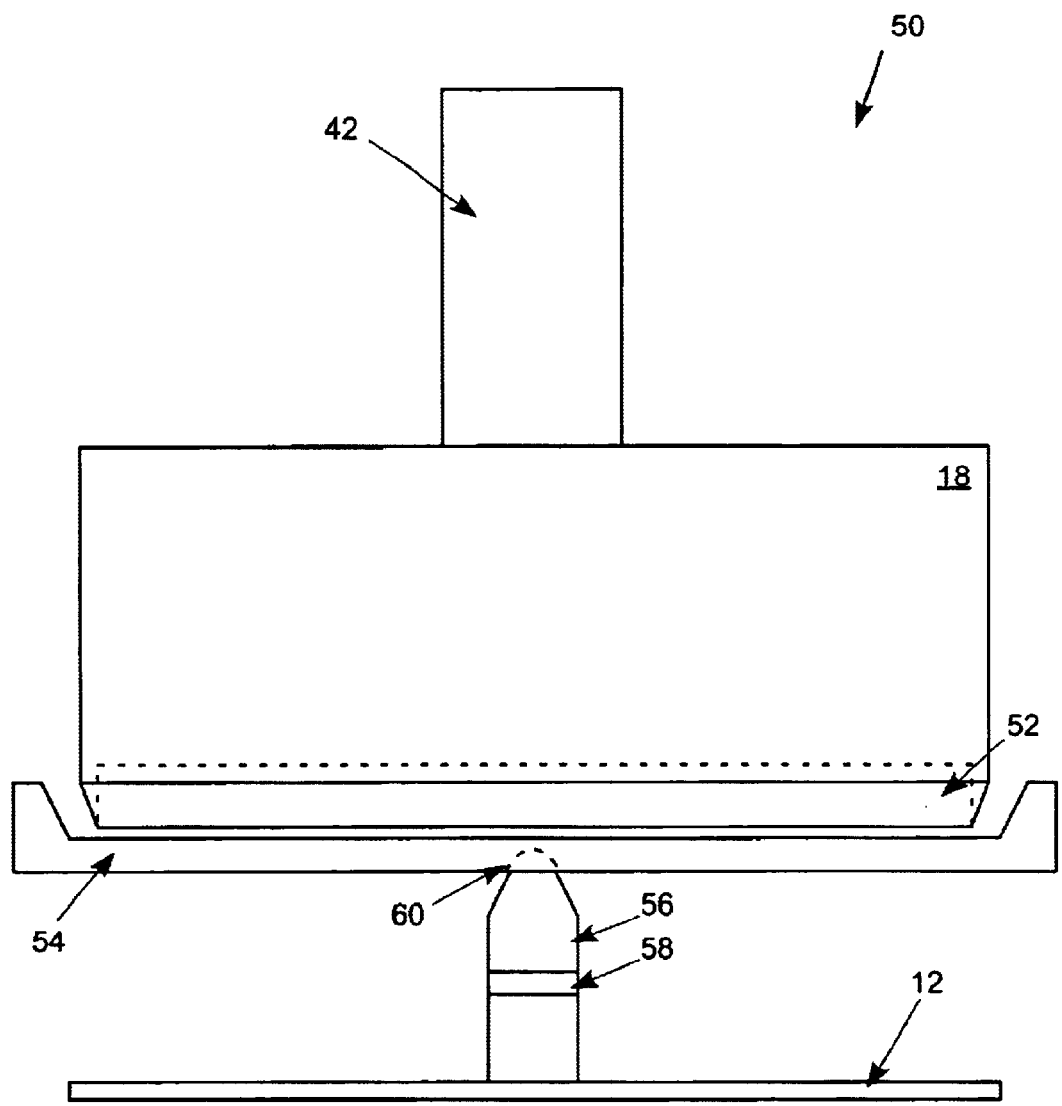
FIG. 1C is diagram showing a prior art spindle force downforce calibration system.
Figure 2:
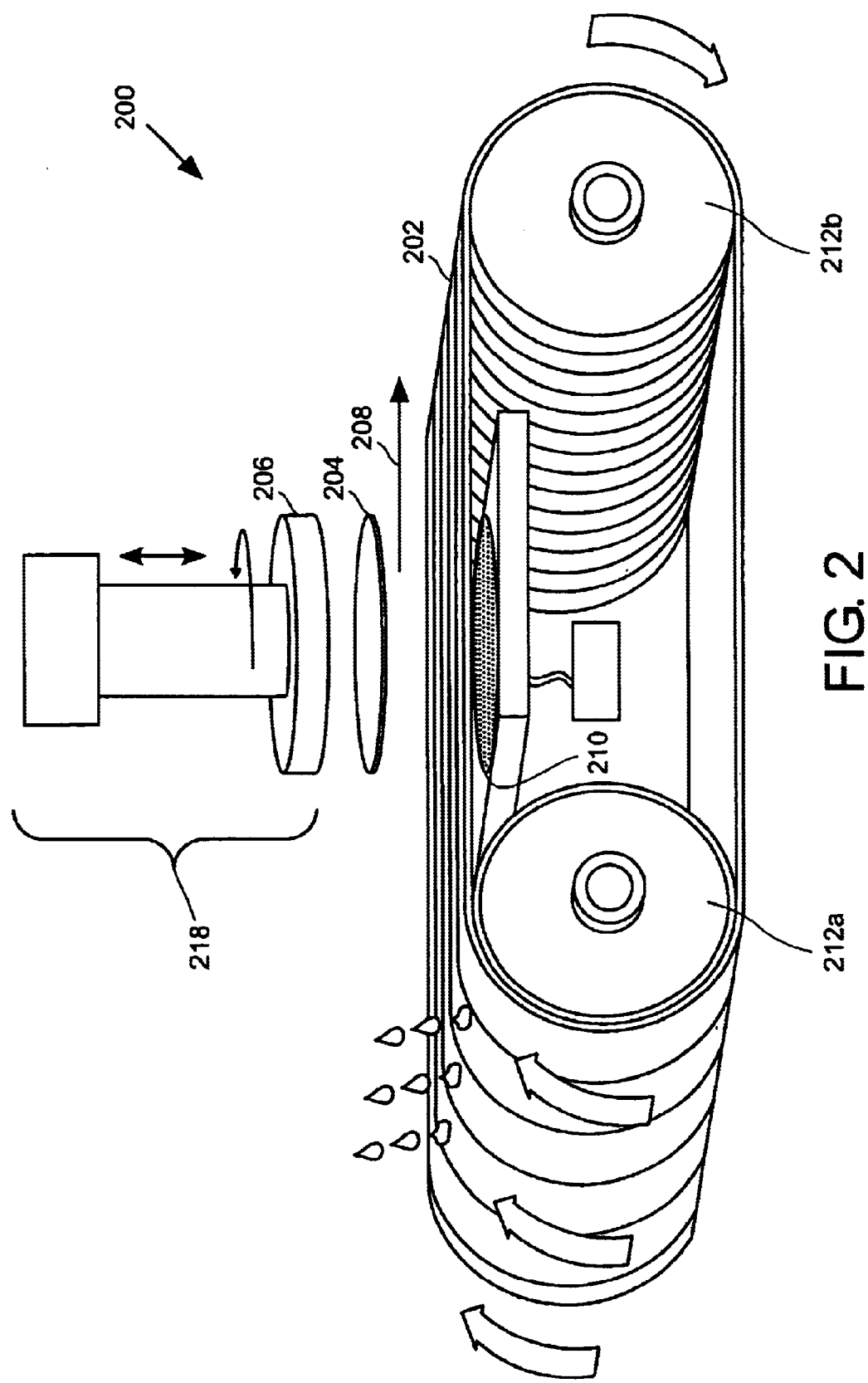
FIG. 2 is a diagram showing a chemical mechanical planarization (CMP) system which can be calibrated using a calibration carrier of the embodiments of the present invention.

By way of background, FIG. 2 is a diagram showing a chemical mechanical planarization (CMP) system 200 which can be calibrated using a calibration carrier of the embodiments of the present invention. A wafer carrier 206 is attached to a spindle drive assembly 218 and secures and holds the wafer 204 in place during wafer polishing operations. A polishing belt 202 forms a continuous loop around rotating drums 212a and 212b. It should be appreciated that the polishing belt 202 may be any suitable type of structure such as, for example, a single layer polishing pad, a polishing pad supported by a stainless steel layer, a multilayer polishing structure (e.g., a polishing pad over a cushioning layer which is in turn over a stainless steel layer). It should also be appreciated that the principles described herein also apply to non-belt CMP devices, e.g., rotary devices. The polishing belt 202, in one embodiment, is a single layer polyurethane polishing pad utilized in linear CMP systems, and generally rotates in a direction indicated by a direction 208 at a speed of about 400 feet per minute. However, it should be noted that the polishing belt 202 rotational speed can vary depending upon the specific CMP operation.

As the belt 202 rotates, polishing slurry is applied and spread over the surface of the polishing belt 202. The wafer carrier 106 may then be used to lower the wafer 204 onto the surface of the rotating polishing belt 202. A platen 210 may support the polishing belt 202 during the polishing process, and may utilize any suitable type of bearing such as an air bearing. In this manner, the surface of the wafer 204 is substantially smoothed in an even manner during planarization.

In some cases, the CMP operation is used to planarize materials such as copper (or other metals), and in other cases, it may be used to remove layers of dielectric or combinations of dielectric and copper. The rate of planarization may be changed by adjusting the polishing pressure. The polishing rate is generally proportional to the amount of polishing pressure applied by the wafer carrier 206 with the wafer 204 to the polishing pad against the platen 210. By effectively managing the polishing rate, the desired amount of material is removed from the surface of the wafer 204. When the polishing is complete the wafer carrier 206 may be used to raise the wafer 204 off of the polishing belt 202. The wafer 204 is then ready to proceed to a wafer cleaning system. Therefore stable and flexible application of downward force by the wafer carrier 206 is extremely important for efficient wafer production. To ensure proper downforce is applied to the spindle drive assembly, embodiments of the present invention utilize a spindle drive downforce calibration system, as described subsequently with respect to FIG. 3.

Figure 3:
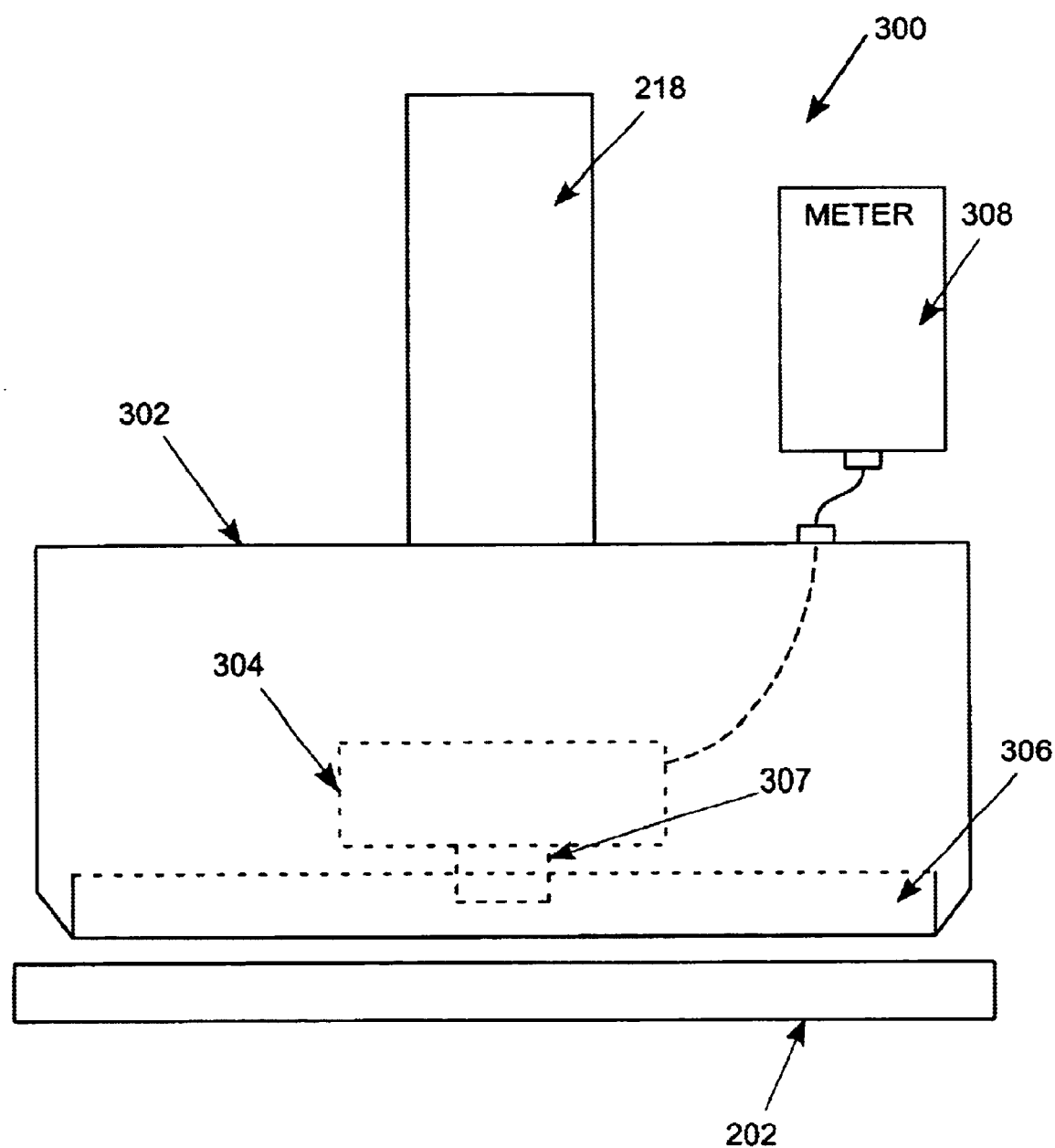
FIG. 3 is a diagram showing a spindle drive downforce calibration system, in accordance with an embodiment of the present invention.

FIG. 3 is a diagram showing a spindle drive downforce calibration system 300, in accordance with an embodiment of the present invention. The spindle drive downforce calibration system 300 includes a calibration wafer carrier 302 having an internal calibration load cell 304 coupled to a polishing plate 306 via a calibration post 307. The calibration load cell 304 is further in communication with a calibration meter 308. As mentioned previously, the calibration wafer carrier 302 replaces the normal wafer carrier during calibration and is attached to the spindle drive assembly 218 of the CMP system.

By locating the calibration load cell 304 within the calibration wafer carrier 302, the spindle drive downforce can be measured at the polishing height, which is the normal wafer carrier height during a CMP process, resulting in higher measurement accuracy. In addition, calibration time is greatly reduced since the spindle drive downforce calibration system 300 is self-contained and does not require the placement of various calibration components beneath the wafer carrier.

In operation, the spindle drive assembly 218 applies downforce to the calibration wafer carrier 302. The polishing belt 202 provides resistance to the downforce, which is measured by the calibration load cell 304 via the polishing plate 306. In one embodiment, both the calibration load cell 304 and the polishing plate 306 are loosely positioned within the calibration wafer carrier 302, with the calibration post 307 providing a means for transferring force between the polishing plate 306 and the calibration load cell 304. In this manner, the resistance force from the polishing belt 202 is transferred to the polishing plate 306, and then to the calibration load cell 304 via the calibration post 307.

The calibration load cell 304 then provides calibration data regarding the measured downforce to the meter 308, which can be a hand-held meter, in-situ meter, or any other meter device capable of presenting psi data to a user. The calibration data can then be compared to downforce data measured by a tool load cell, such as the spindle drive assembly load cell, which is located elsewhere on CMP system and is used to control downforce during normal CMP operation. Thus, the calibration data provided by the calibration load cell 304 provides a fixed reference to correct the spindle drive assembly load cell. For a detailed description of the spindle drive assembly load cell, reference may be made to U.S. patent application Ser. No. 10/033,671, entitled "Method and Apparatus for Applying Downward Force on Wafer During CMP," and having inventors Anthony de la Llera, Xuyen Pham, Andrew Siu, Tuan A. Nguyen, and Tony Luong, assigned to the assignee of the present application, and which is hereby incorporated by reference.

Figure 4:
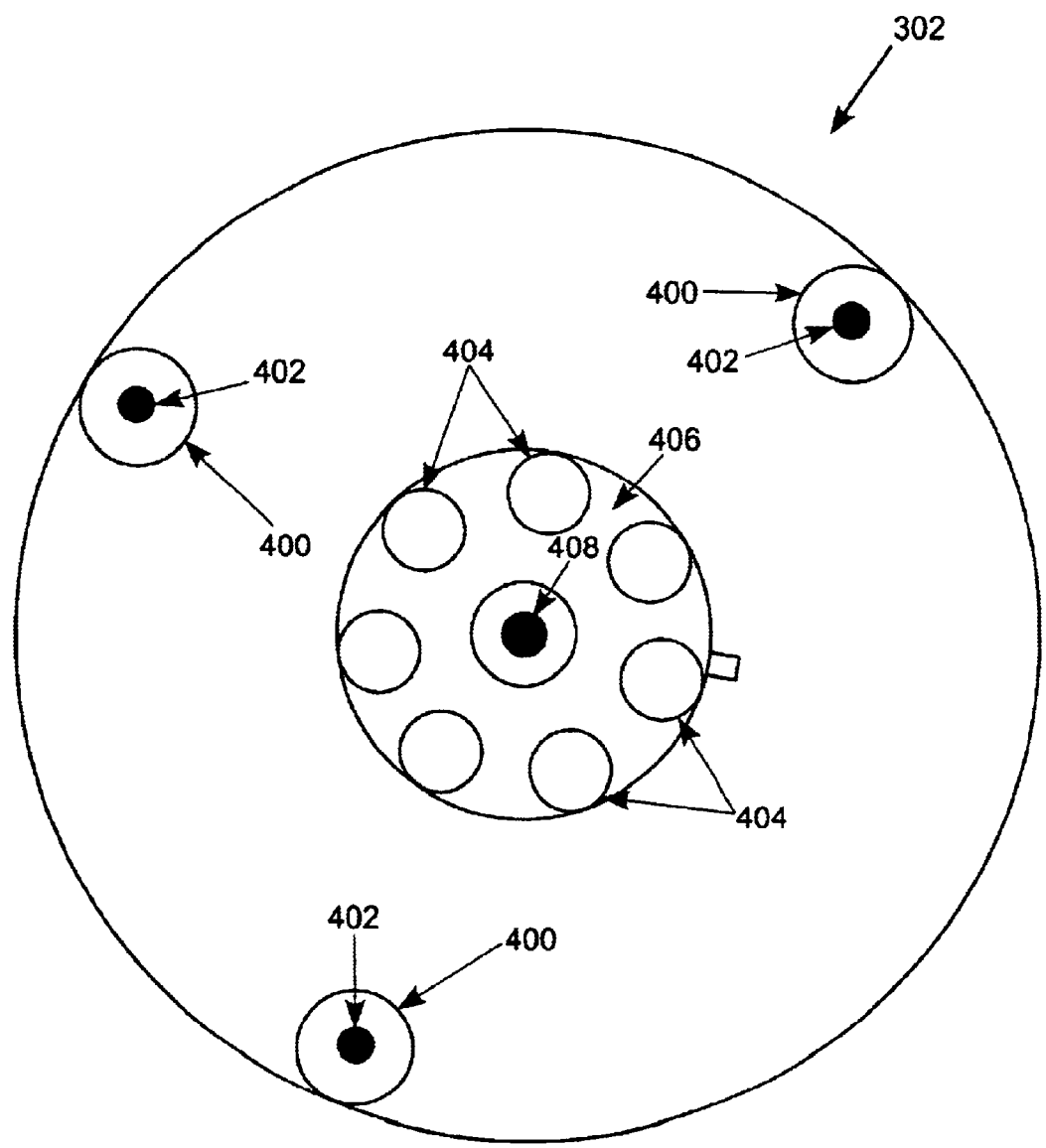
FIG. 4 is a bottom view of a calibration wafer carrier, in accordance with an embodiment of the present invention.

FIG. 4 is a bottom view of a calibration wafer carrier 302, in accordance with an embodiment of the present invention. The calibration wafer carrier 302 is shown in FIG. 4 with the polishing plate removed to reveal the interior of the calibration wafer carrier 302. As shown in FIG. 4, the calibration wafer carrier 302 includes a plurality of alignment pins 402, each located within a pin recess 400. The calibration wafer carrier 302 further includes a calibration load cell recess 406 having a center 408, which is surrounded by a plurality of bolts 404 that hold the calibration load cell in place. The calibration load cell recess 406 holds the calibration load cell during a calibration process.

The calibration wafer carrier 302 fits loosely together to avoid any binding within the calibration wafer carrier 302 when it is being turned. As such, in one embodiment, the center 408 of the calibration load cell recess 410 is where substantially all the downforce is being applied. Further, the alignment pins 402, located within the pin recesses 400, hold the polishing plate in place when the calibration wafer carrier 302 is turned during calibration so that the polishing plate does not rotate.

Figure 5:
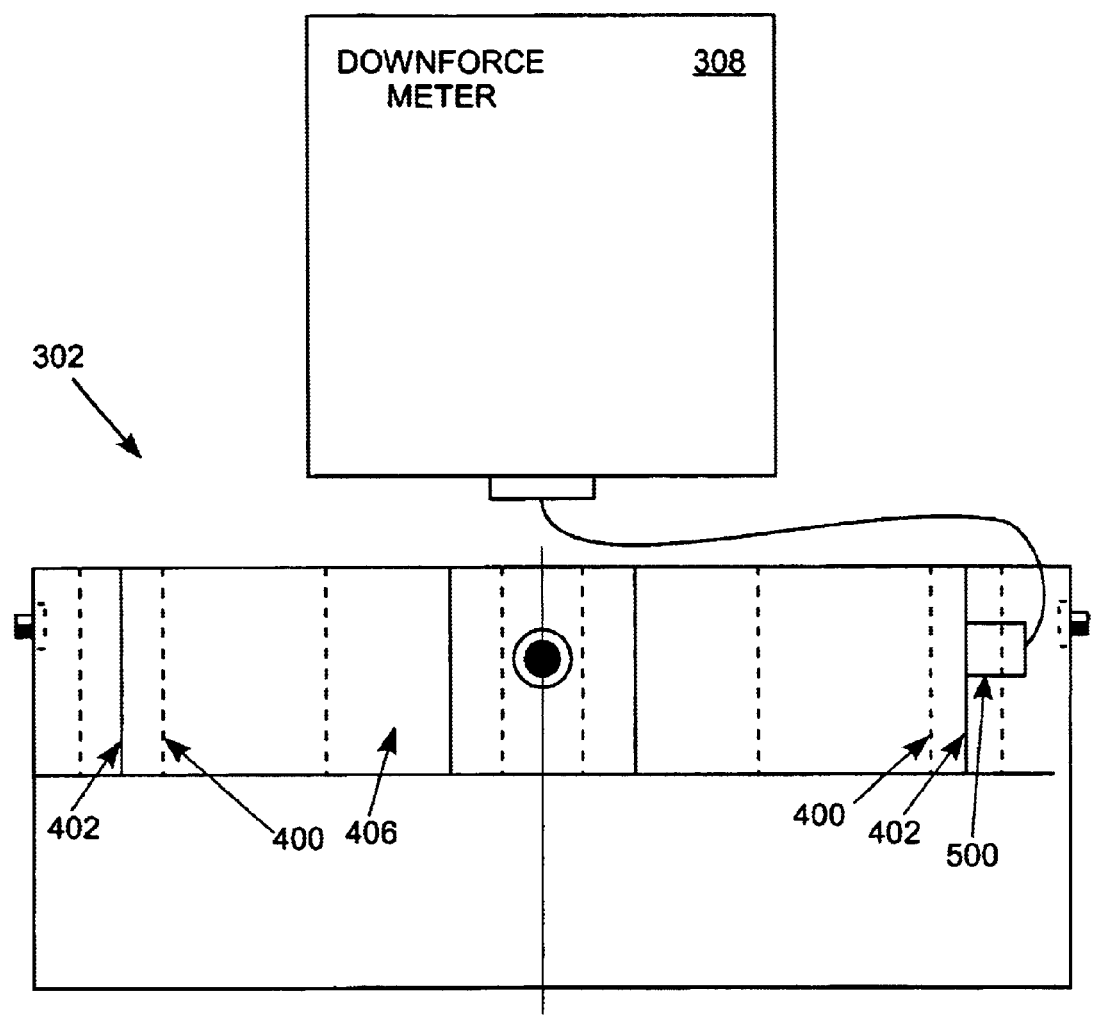
FIG. 5 is a side view of a calibration wafer carrier, in accordance with an embodiment of the present invention.

FIG. 5 is a side view of a calibration wafer carrier 302, in accordance with an embodiment of the present invention. As above, the calibration wafer carrier 302 includes a plurality of alignment pins 402, each located within a pin recess 400, and a calibration load cell recess 406 that holds the calibration load cell during a calibration process. In one embodiment, the calibration load cell includes two different metals, wherein the metals stretch during operation. The calibration load cell then takes a comparison between the two metals and provides a resistance that changes and affects the meter used to read the calibration load cell. In particular, the resistance data forms the calibration data that is provided to the Downforce meter 308 using a downforce meter connector 500 located on the side of the calibration wafer carrier 302.

Figure 6:
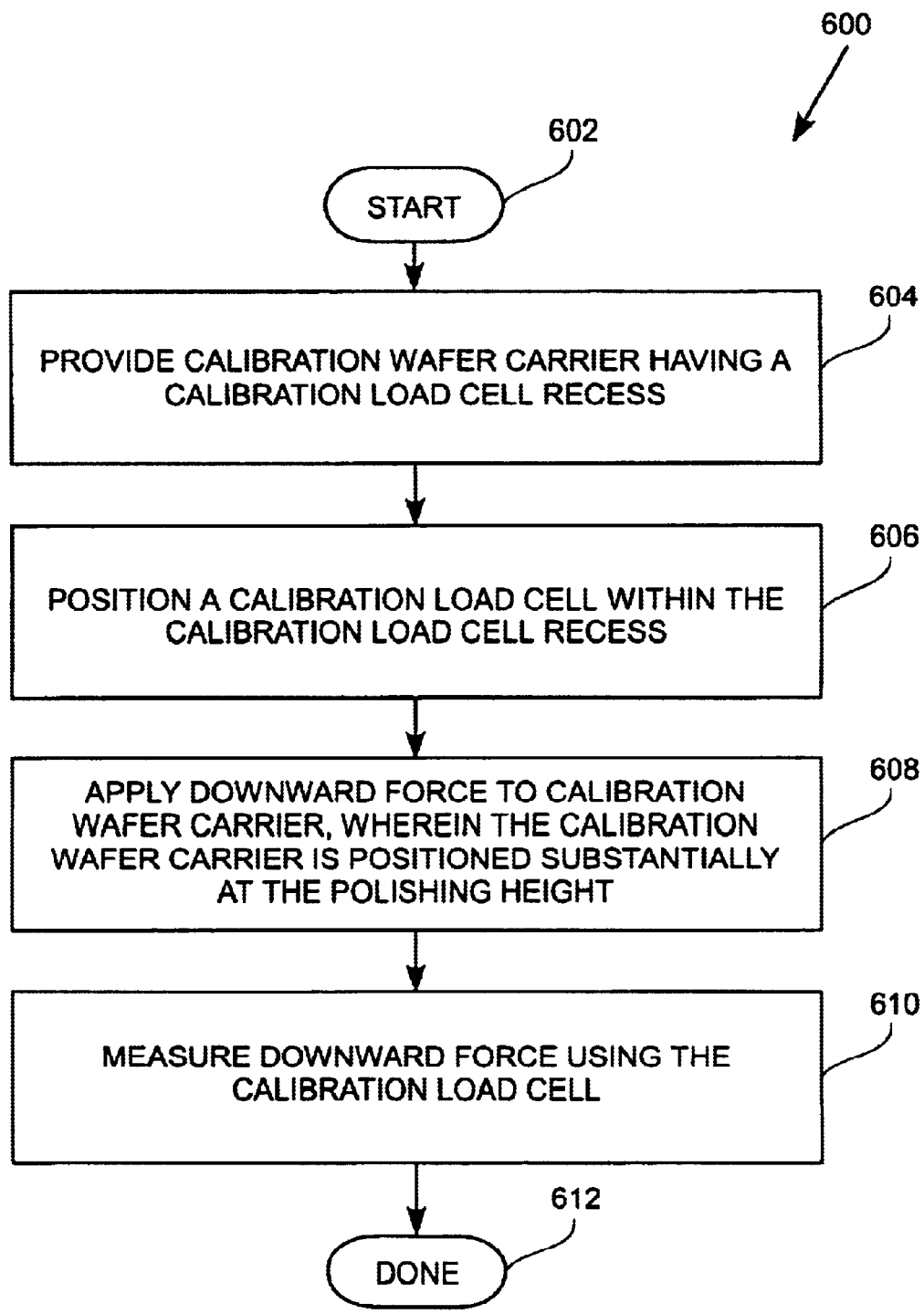
FIG. 6 is a flowchart showing a method for spindle downforce calibration, in accordance with an embodiment of the present invention.

FIG. 6 is a flowchart showing a method 600 for spindle downforce calibration, in accordance with an embodiment of the present invention. In operation 602, preprocess operations are performed. Preprocess operations can include removing the normal wafer carrier and other preprocess operations that will be apparent to those skilled in the art after a careful reading of the present disclosure.

In operation 604, a calibration wafer carrier having a calibration load cell recess is provided. The calibration wafer carrier includes a calibration load cell recess that includes a center, which is surrounded by a plurality of bolts to hold a calibration load cell in place. The calibration wafer carrier fits loosely together to avoid any binding within the calibration wafer carrier when being turned. As such, in one embodiment, the center of the calibration load cell recess is where substantially all the downforce is being applied Alignment pins, located within the pin recesses, hold the polishing plate in place so that the polishing plate does not rotate when the calibration wafer carrier is turned during calibration.

A calibration load cell is positioned within the calibration load cell recess, in operation 606. The calibration load cell recess holds the calibration load cell during a calibration process. As mentioned above, the calibration load cell can include two different metals, wherein the metals are stretch during operation. The calibration load cell takes a comparison between the two metals and provides a resistance that changes and effects a meter used to read the calibration load cell. In particular, the resistance data forms the calibration data that is provided to the meter using a downforce meter connector located on the side of the calibration wafer carrier.

In operation 608, downward force is applied to the calibration wafer carrier. In particular, the calibration wafer carrier is positioned substantially at the polishing height during downward force application and measurement. As mentioned above, the polishing height is substantially equivalent to a height of a normal wafer carrier during a CMP operation. The polishing surface, such as a polishing belt, provides resistance to the downforce, and is measured by the calibration load cell via a polishing plate. In one embodiment, both the calibration load cell and the polishing plate are loosely positioned within the calibration wafer carrier, with the calibration post providing a means for transferring force between the polishing plate and the calibration load cell. In this manner, the resistance force from the polishing belt is transferred to the polishing plate, and then to the calibration load cell via the calibration post.

The downward force is measured using the load cell in operation 610. As mentioned above, the calibration load cell takes a comparison between the two metals and provides a resistance that changes and affects a meter used to read the calibration load cell. The resistance data forms the calibration data. The calibration load cell provides calibration data regarding the measured downforce to a meter, which can be a hand-held meter, in-situ meter, or any other meter device capable of presenting psi data to a user. The calibration data can then be compared to downforce data measured by the tool load cell, such as the spindle drive assembly load cell, which is located elsewhere on CMP system and is used to control downforce during normal CMP operation. Thus, the calibration data provided by the calibration load cell provides a fixed reference to correct the spindle drive assembly load cell.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for spindle downforce calibration, comprising the operations of:
    providing a calibration wafer carrier having a calibration load cell recess;
    positioning a calibration load cell within the calibration load cell recess;
    applying downward force to the calibration wafer carrier, the calibration wafer carrier being positioned substantially at a polishing height, wherein the polishing height is substantially equivalent to a height of a normal wafer carrier during a chemical mechanical polishing (CMP) operation; and
    measuring the downward force using the calibration load cell.

2. A method as recited in claim 1, further comprising the operation of comparing the measured downward force to a tool downward force measurement, the tool downward force measurement being measured using a tool load cell.

3. A method as recited in claim 2, wherein the tool load cell is further utilized to measure tool downward force during a normal CMP process.

4. A method as recited in claim 3, wherein the calibration load cell provides calibration data to a meter.

5. A method as recited in claim 4, wherein the meter is a hand-held meter.

6. A method as recited in claim 1, wherein the calibration wafer carrier replaces a normal wafer carrier during a calibration operation.

7. A system for spindle downforce calibration, comprising:
    a calibration wafer carrier having a calibration load cell recess;
    a calibration load cell disposed within the calibration load cell recess; and
    a meter in communication with the calibration load cell, the calibration load cell measuring a downward force applied to the calibration wafer carrier, wherein the calibration wafer carrier is positioned substantially at a polishing height, the polishing height being substantially equivalent to a height of a normal wafer carrier during a chemical mechanical polishing (CMP) operation.

8. A system as recited in claim 7, wherein the measured downward force is compared to a tool downward force measurement, the tool downward force measurement being measured using a tool load cell.

9. A system as recited in claim 8, wherein the tool load cell is further utilized to measure tool downward force during a normal CMP process.

10. A system as recited in claim 9, wherein the calibration load cell provides calibration data to the meter.

11. A system as recited in claim 10, wherein the meter is a hand-held meter.

12. A system as recited in claim 7, wherein the calibration wafer carrier replaces a normal wafer carrier during a calibration operation.

13. A calibration wafer carrier for spindle downforce calibration, comprising:
    a calibration load cell recess;
    a calibration load cell disposed within the calibration load cell recess, the calibration load cell capable of measuring a downward force; and a downforce meter connector coupled the calibration load cell and to a meter, wherein the calibration load cell measures a downward force applied to the to the calibration wafer carrier when the calibration wafer carrier is positioned substantially at a polishing height, the polishing height being substantially equivalent to a height of a normal wafer carrier during a chemical mechanical polishing (CMP) operation.

14. A calibration wafer carrier as recited in claim 13, wherein the downward force is compared to a tool downward force measurement, the tool downward force measurement being measured using a tool load cell.

15. A calibration wafer carrier as recited in claim 14, wherein the tool load cell is further utilized to measure tool downward force during a normal CMP process.

16. A calibration wafer carrier as recited in claim 15, wherein the calibration load cell provides calibration data to the meter.

17. A calibration wafer carrier as recited in claim 13, wherein the meter is a hand-held meter.

18. A calibration wafer carrier as recited in claim 13, wherein the calibration wafer carrier replaces a normal wafer carrier during a calibration operation.

* * * * *